(12) United States Patent
Li et al.

(10) Patent No.: US 10,244,154 B2
(45) Date of Patent: Mar. 26, 2019

(54) IMAGING COLLECTING SYSTEM, IMAGE COLLECTING PROCESSING SYSTEM AND IMAGE COLLECTING PROCESSING METHOD

(71) Applicants: BOE TECHNOLOGY GROUP CO., LTD., Beijing (CN); PEKING UNIVERSITY, Beijing (CN)

(72) Inventors: Xinguo Li, Beijing (CN); Yi Wang, Beijing (CN); Xing Zhang, Beijing (CN); Yanbing Wu, Beijing (CN)

(73) Assignees: BOE TECHNOLOGY GROUP CO., LTD., Beijing (CN); PEKING UNIVERSITY, Beijing (CN)

( * ) Notice: Subject to any disclaimer, the term of this patent is extended or adjusted under 35 U.S.C. 154(b) by 57 days.

(21) Appl. No.: 15/511,813

(22) PCT Filed: May 20, 2016

(86) PCT No.: PCT/CN2016/082721
§ 371 (c)(1),
(2) Date: Mar. 16, 2017

(87) PCT Pub. No.: WO2017/133138
PCT Pub. Date: Aug. 10, 2017

(65) Prior Publication Data
US 2018/0234602 A1    Aug. 16, 2018

(30) Foreign Application Priority Data

Feb. 5, 2016    (CN) .......................... 2016 1 0082147

(51) Int. Cl.
| | | |
|---|---|---|
| *G02F 1/01* | (2006.01) | |
| *B60R 1/00* | (2006.01) | |
| *H04N 5/225* | (2006.01) | |
| *G02F 1/1335* | (2006.01) | |
| *G02B 27/28* | (2006.01) | |
| *G06K 9/00* | (2006.01) | |
| *G06K 9/20* | (2006.01) | |

(52) U.S. Cl.
CPC .............. *H04N 5/2258* (2013.01); *B60R 1/00* (2013.01); *G02B 27/283* (2013.01);
(Continued)

(58) Field of Classification Search
CPC combination set(s) only.
See application file for complete search history.

(56) References Cited

U.S. PATENT DOCUMENTS 5,543,917 A * 8/1996 Bushman ............... G01N 21/21
356/364
9,494,804 B2 * 11/2016 Zuo ........................... G02F 1/09
(Continued)

FOREIGN PATENT DOCUMENTS

| CN | 102075679 A | 5/2011 |
|---|---|---|
| CN | 102450023 A | 5/2012 |

(Continued)

OTHER PUBLICATIONS

The First Chinese Office Action dated Dec. 28, 2017; Appln. No. 201610082147.9.
(Continued)

*Primary Examiner* — Tsung Yin Tsai
(74) *Attorney, Agent, or Firm* — Ladas & Parry LLP

(57) ABSTRACT

An image collecting system, an image collecting processing system and an image collecting processing method are provided by embodiments of the present disclosure. The image collecting system (100) includes a pick-up device (130) and a polarizing device (152). The pick-up device (130) is configured to acquire a first image and a second image of a target scene. The polarizing device (152) is disposed in an input path of the pick-up device (130) corresponding to the second image when the pick-up device (130) acquires the second image, to allow first incident light (110) for forming the first image and second incident light (Continued)

(120) for forming the second image, entering the pick-up device (130), to have different polarization states. The embodiments of the present disclosure can reduce the amount of image information processing and improve the accuracy of image processing.

19 Claims, 4 Drawing Sheets

(52) U.S. Cl.
CPC .......... *G02F 1/0136* (2013.01); *G02F 1/1335* (2013.01); *G06K 9/00791* (2013.01); *G06K 9/209* (2013.01); *H04N 5/225* (2013.01); *B60R 2300/10* (2013.01); *B60R 2300/303* (2013.01)

(56) References Cited

U.S. PATENT DOCUMENTS

| | | | |
|---|---|---|---|
| 9,562,764 B2* | 2/2017 | France | G01C 15/00 |
| 2010/0157082 A1* | 6/2010 | Katerberg | G02B 27/281 |
| | | | 348/222.1 |
| 2010/0283883 A1* | 11/2010 | Sato | G02B 27/283 |
| | | | 348/335 |
| 2013/0136306 A1 | 5/2013 | Li et al. | |
| 2015/0172631 A1 | 6/2015 | Kasahara | |
| 2015/0256733 A1* | 9/2015 | Kanamori | H04N 5/2354 |
| | | | 348/234 |
| 2016/0062121 A1* | 3/2016 | Border | G02B 27/0172 |
| | | | 359/630 |

FOREIGN PATENT DOCUMENTS

| | | |
|---|---|---|
| CN | 103080978 A | 5/2013 |
| CN | 104487803 A | 4/2015 |
| CN | 104954656 A | 9/2015 |
| CN | 204967991 A | 1/2016 |
| CN | 105530419 A | 4/2016 |
| JP | 2010-004090 A | 1/2010 |
| WO | 2011/049149 A1 | 4/2011 |

OTHER PUBLICATIONS

International Search Report and Written Opinion dated Oct. 28, 2016; PCT/CN2016/082721.
The Chinese Second Office Action dated Sep. 30, 2018, Appln. No. 201610082147.9.

* cited by examiner

IMAGING COLLECTING SYSTEM, IMAGE COLLECTING PROCESSING SYSTEM AND IMAGE COLLECTING PROCESSING METHOD

TECHNICAL FIELD

Embodiments of the present disclosure relate to an image collecting system, an image collecting processing system and an image collecting processing method.

BACKGROUND

When a vehicle runs in rainy days, especially when running in a heavy rain, lots of rain water would be stay on the front windshield, which would have a serious impact on the driver's view.

SUMMARY

Embodiments of the present disclosure provide an image collecting system, an image collecting processing system and an image collecting processing method, which reduce the amount of image information processing and improve the accuracy of image processing.

According to at least one embodiment of the present disclosure, an image collecting system is included, including: a pick-up device configured to acquire a first image and a second image of a target scene; and a polarizing device configured to be overlapped with an input path of the pick-up device corresponding to the second image when the pick-up device acquires the second image, and configured to allow first incident light for forming the first image and second incident light for forming the second image, entering the pick-up device, to have different polarization states.

According to at least one embodiment of the present disclosure, an image collecting processing system is provided, including the image collecting system, and an image processing device configured to generate a target image according to the first image and the second image.

According to at least one embodiment of the present disclosure, an image collecting processing method is provided, including: acquiring a first image of a target scene by a pick-up device; acquiring a second image of the target scene by a polarizing device and the pick-up device, in this step, the polarizing device is overlapped with an input path of the pick-up device corresponding to the second image when the pick-up device acquires the second image, to allow first incident light for forming the first image and second incident light for forming the second image, entering the pick-up device, to have different polarization states; and generating a target image according to the first image and the second image.

BRIEF DESCRIPTION OF THE DRAWINGS

Brief description will be given below to the accompanying drawings of embodiments to provide a more clear understanding of the technical proposals of the embodiments of the present disclosure. It is apparent that the drawings described below only involve some embodiments of the present disclosure but are not intended to limit the present disclosure.

DETAILED DESCRIPTION

Figure 1:
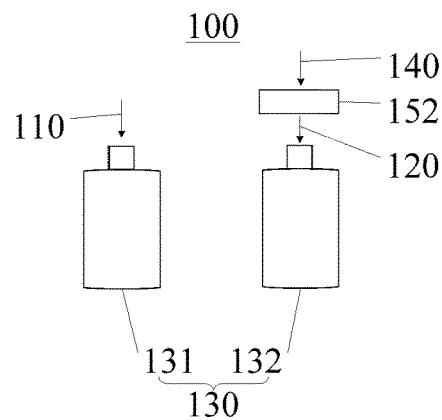
FIG. 1 is a schematic top view of an image collecting system provided by at least one embodiment of the present disclosure.

In order to make objects, technical solutions and advantages of the embodiments of the disclosure apparent, technical solutions according to the embodiments of the present disclosure will be described clearly and fully as below in conjunction with the accompanying drawings of embodiments of the present disclosure. It is apparent that the described embodiments are just a part but not all of the embodiments of the disclosure. Based on the described embodiments herein, those skilled in the art can obtain other embodiment(s), without any creative work, which shall be within the scope of the present disclosure.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present disclosure, are not intended to indicate any sequence, amount or importance, but for distinguishing various components. The terms, such as "comprise/comprising," "include/including," or the like are intended to specify that the elements or the objects stated before these terms encompass the elements or the objects and equivalents thereof listed after these terms, but not preclude other elements or objects. The terms, such as "connect/connecting/connected," "couple/coupling/coupled" or the like, are not limited to a physical connection or mechanical connection, but may include an electrical connection/coupling, directly or indirectly. The terms, "on," "under," "left," "right" or the like are only used to indicate relative position relationship, and when the position of the object which is described is changed, the relative position relationship may be changed accordingly.

The inventor of the application has noticed in the research that for the commonly used image collecting processing system, the rain can reflect at least partial light from a target scene, so that light for forming images, which come from the target scene and is incident into the image collecting processing system, includes the light reflected by the rain, so that the information of the images acquired by the image collecting processing system can be insufficient and the accuracy is not high. Moreover, the common used image collecting processing system needs to analyze and process all the pixels in an acquired initial image to generate a target image, so that the amount of image information processing is relatively large and the processing time is relatively long.

Embodiments of the present disclosure provide an image collecting system, an image collecting processing system and an image collecting processing method. The image collecting system includes a pick-up device and a polarizing device. The pick-up device is configured to acquire a first image and a second image of a target scene. The polarizing device is disposed in an input path of the pick-up device corresponding to the second image when the pick-up device acquires the second image, so that first incident light for forming the first image and second incident light for forming the second image, entering the pick-up device, can have different polarization states.

On one hand, the embodiment of the present disclosure can remove at least partial polarized light in the light reflected by the rain by arranging the polarizing device in the image collecting system, so as to reduce the impact of rain on the light which comes from the target scene and is incident into the pick-up device. On the other hand, the embodiment of the present disclosure generates the target image according to the first image and the second image acquired by the image collecting system, and can reduce the amount of image information processing and the processing time and improve the accuracy of image processing.

At least one embodiment of the present disclosure provides an image collecting system, which respectively acquires a first image and a second image of the same target scene at the same moment or different moments by two pick-up devices.

As illustrated in FIG. 1, at least one embodiment of the present disclosure provides an image collecting system 100, which includes a pick-up device 130 and a polarizing device 152.

The pick-up device 130 is configured to acquire a first image and a second image of a target scene and includes a first sub-pick-up device 131 and a second sub-pick-up device 132. The first sub-pick-up device 131 is configured to acquire the first image of the target scene, and the second sub-pick-up device 132 is configured to acquire the second image of the target scene.

The polarizing device 152 is overlapped with an input path of the pick-up device corresponding to the second image 130 when the pick-up device 130 acquires the second image, namely the polarizing device 152 is overlapped with an input path of the second sub-pick-up device 132 when the second sub-pick-up device 132 acquires the second image, so that partial polarized light in light 140, which comes from the target scene and is incident into the polarizing device 152, can be removed. At this point, first incident light 110 which enters the first sub-pick-up device 131 to form the first image is non-polarized light. In this way, the polarizing device 152 allows the first incident light 110 for forming the first image and second incident light 120 for forming the second image, entering the pick-up device 130, to have different polarization states.

The pick-up device 152 may adopt an imaging sensor, such as charge-coupled device (CCD) and complementary metal oxide semiconductor (CMOS).

For instance, the polarizing device may adopt an absorptive-type polarizer, such as wire grating polarizer, a multi-layer polarizer, such as pile of plates (a stacked structure of a plurality of glass plates), or a polarizing prism, such as a Nicol prism.

Figure 2:
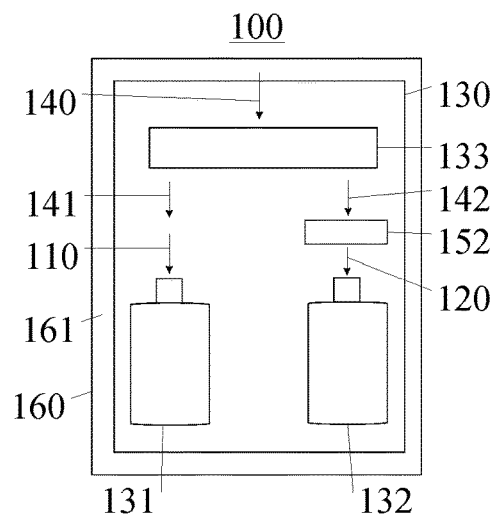
FIG. 2 is a schematic top view of an image collecting system including a light-splitting device, provided by at least one embodiment of the present disclosure.

For instance, as illustrated in FIG. 2, the pick-up device 130 may also include a light-splitting device 133. The light-splitting device 133 is configured to split light 140, which comes from the target scene and is incident into the light-splitting device 133, into a first light path 141 for the first sub-pick-up device 131 and a second light path 142 for the second sub-pick-up device 132. The polarizing device 152 is disposed in the second light path 142 when the second sub-pick-up device 132 acquires the second image. In the example, by adoption of the light-splitting device 133, information about the target scene in the first light path 141 and the second light path 142 can be same, so that the acquired first image and second image are only relevant to the polarization state of the first incident light 110 of the first sub-pick-up device 131 and the second incident light 120 of the second sub-pick-up device 132. In this way, the accuracy of a target image can be improved.

In an embodiment of the present disclosure, for instance, the light-splitting device may adopt a light-splitting device, such as a beam splitter, and a transflective mirror.

Continuously refer to FIG. 2, for instance, the image collecting system 100 may also include a support substrate 160. The support substrate 160 has a support surface 161 for supporting the pick-up device 130. The polarization direction of the polarizing device 152 may be approximately perpendicular to the support surface 161. As information from the horizontal direction is more important to drivers in a vehicle travelling process, when the polarization direction of the polarizing device 152 is approximately perpendicular to the support surface 161 (the support surface 161 may be approximately along the horizontal direction in the vehicle travelling process) of the support substrate 160, the second incident light 120 does not include polarized light in the horizontal direction in the light reflected by the rain, so that the second image formed by the second incident light 120 can include more accurate horizontal direction information of the target scene. For instance, as illustrated in FIG. 3, the polarizing device 152 is perpendicular to the support surface 161, and the polarization direction (as shown by an arrow in FIG. 3) of the polarizing device is perpendicular to the support surface 161.

For instance, the support substrate 160 may be any substrate with supporting capacity, such as a plastic substrate, a glass substrate and a wood substrate.

Figure 3:
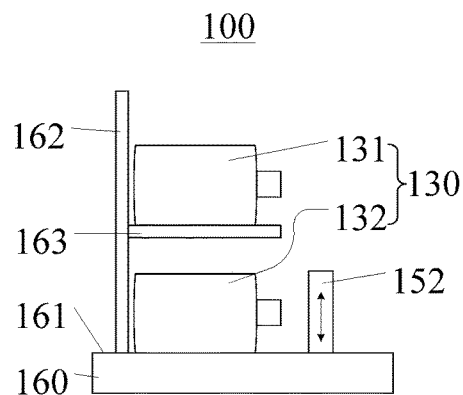
FIG. 3 is a schematic side view of an image collecting system including a support substrate, provided by at least one embodiment of the present disclosure.

For instance, as illustrated in FIG. 3, in the image collecting system 100, the first sub-pick-up device 131 and the second sub-pick-up device 132 may be sequentially arranged in a direction approximately perpendicular to the support surface 161. In this way, the horizontal parallax between the first image acquired by the first sub-pick-up device 131 and the second image acquired by the second sub-pick-up device 132 can be reduced, and more accurate horizontal direction information can be provided.

For instance, a support including a vertical portion 162 and a horizontal portion 163 may be disposed on the support substrate 160. The vertical portion 162 is configured to support the horizontal portion 163. The horizontal portion 163 may be configured to support a sub-pick-up device away from the support surface 161 (for instance, as shown by the first sub-pick-up device 131 in FIG. 3).

The first sub-pick-up device 131 may be disposed on a side of the second sub-pick-up device 132 away from the support substrate 160, as shown in FIG. 3; or the first sub-pick-up device 131 may also be disposed on a side of the second sub-pick-up device 132 close to the support substrate 160.

Figure 4:
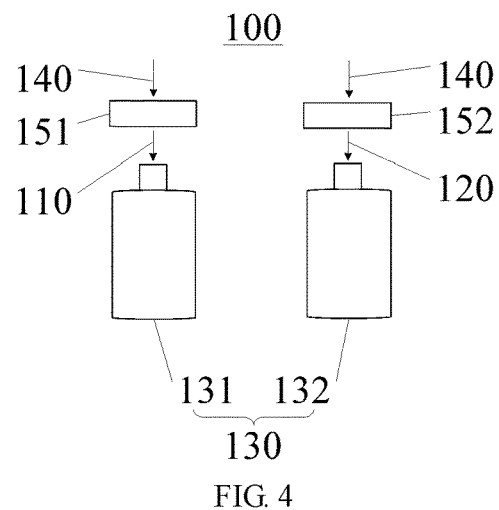
FIG. 4 is a schematic top view of an image collecting system including second polarizing device, provided by at least one embodiment of the present disclosure.

For instance, as shown in FIG. 4, the image collecting system 100 may also include a second polarizing device 151. The second polarizing device 151 is overlapped with an input path of the first sub-pick-up device 131 when the first sub-pick-up device 131 acquires the first image, and the polarization direction of the second polarizing device 151 is different from the polarization direction of the polarizing device 152. The second polarizing device 151 may reduce the impact of rain on the first image. As the two polarizing devices have different polarization directions, the first image and the second image can include different target scene information, so that the accuracy of the target image can be improved.

For instance, the polarization direction of the second polarizing device 151 may be perpendicular to the polarization direction of the polarizing device 152. In this way, the impact of rain on the accuracy of the target image can be reduced to a greater extent.

For instance, the transmittance of the second polarizing device 151 and the polarizing device 152 may be same. In this way, the step of adjusting the brightness of the first image and the second image can be saved in the process of generating the target image by utilizing the first image and the second image.

Figure 5A:
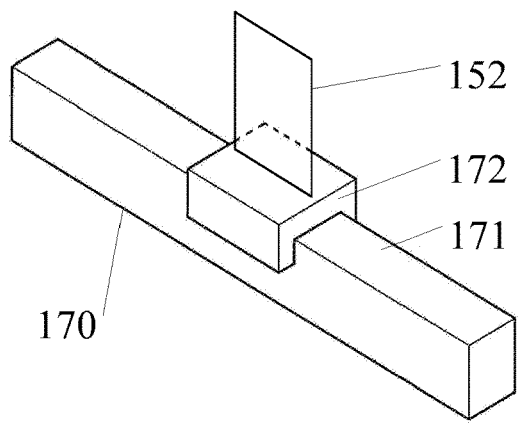
FIG. 5a is a schematic structural view of a polarization switching device in an image collecting system provided by at least one embodiment of the present disclosure.
Figure 5B:
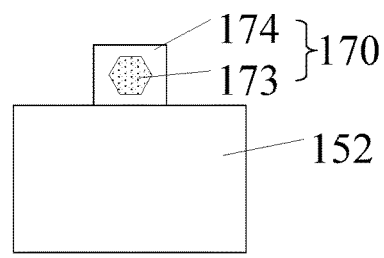
FIG. 5b is a schematic structural view of a polarization switching device in an image collecting system provided by at least one embodiment of the present disclosure.

For instance, as illustrated in FIGS. 5a and 5b, the image collecting system provided by at least one embodiment of the present disclosure may also include a polarization switching device 170 which is configured to move the polarizing device 152 into the input path when the pick-up device (not shown in FIGS. 5a and 5b) acquires the second image, or move the polarizing device 152 out of the input path. The example as shown in FIG. 5a achieves switching by translation, and the example as shown in FIG. 5b achieves switching by rotation.

For instance, as illustrated in FIG. 5a, the polarization switching device 170 includes a slide rail 171 and a sliding block 172 capable of sliding on the slide rail 171; and the polarizing device 152 is disposed on the sliding block 172. In this way, the polarizing device 152 may be moved into or out of the input path of the second sub-pick-up device by controlling the motion of the sliding block 172.

For instance, as illustrated in FIG. 5b, the polarization switching device 170 includes a rotating portion 173 and a connecting portion 174 for connecting the polarizing device 152 and the rotating portion 173; the rotating portion 173 drives the connecting portion 174 to rotate by the rotation of the rotating portion; and the connecting portion 174 may drive the polarizing device 152 to perform rotary motion, so that the polarizing device 152 can be moved out of the input path of the second sub-pick-up device.

FIGS. 5a and 5b are only illustrative. The embodiments of the present disclosure include but not limited thereto.

For instance, by adoption of the polarization switching device 170, the accuracy of the target image can be improved by not using the polarizing device on non-rainy days and using the polarizing device on rainy days.

For instance, as for any example as shown in FIGS. 1 to 4, when the second sub-pick-up device 132 acquires the second image, the polarizing device 152 may be moved into the input path of the second sub-pick-up device 132 through the polarization switching device 170 as shown in FIG. 5a or 5b. After the second image is acquired, the polarizing device 152 may be moved out of the input path of the second sub-pick-up device 132.

Figure 6:
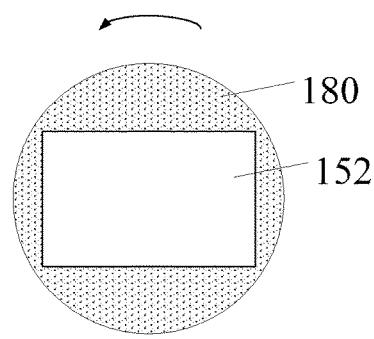
FIG. 6 is a schematic top view of a rotating device in an image collecting system provided by at least one embodiment of the present disclosure.

For instance, as illustrated in FIG. 6, an image collecting system 100 provided by at least one embodiment of the present disclosure may also include a rotating device 180 which is configured to rotate the polarizing device 152 to change the polarization direction of the polarizing device 152. By adoption of the rotating device 180, the polarization direction of the polarizing device 152 may be adjusted according to actual demands, so that the polarizing device 152 can have required ability of absorbing the light reflected by the rain.

In the example as shown in FIG. 6, the rotating device 180 may rotate around a center thereof. For instance, the rotating device 180 may rotate counterclockwise (as shown in FIG. 6) or clockwise through devices, such as driving member, so that the rotating device 180 can drive the polarizing device 152 to rotate so as to change the polarization direction of the polarizing device 152. The embodiments of the present disclosure include but not limited thereto.

For instance, the first sub-pick-up device and the second sub-pick-up device may have same specification, so that the difference between the first sub-pick-up device and the second sub-pick-up device can be reduced, and the accuracy of generating the target image according to the first image and the second image can be improved.

For instance, an image collecting system provided by at least one embodiment of the present disclosure may acquire the first image and the second image at different moments by the same pick-up device, so as to avoid the parallax generated between the first image and the second image.

Figure 7A:
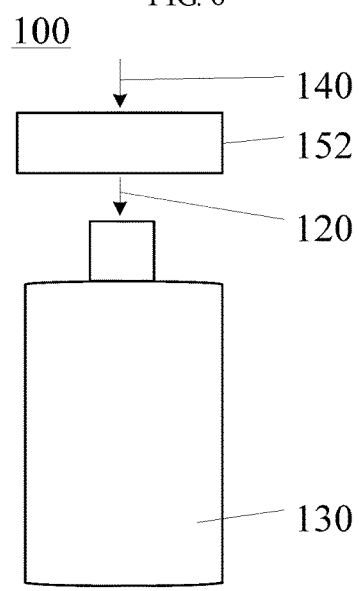
FIG. 7a is a schematic top view of an image collecting system provided by at least one embodiment of the present disclosure in a process of acquiring a second image.

As illustrated in FIG. 7a, at least one embodiment of the present disclosure provides an image collecting system 100, which includes a pick-up device 130 and a polarizing device 152. The pick-up device 130 is configured to acquire a first image and a second image of a target scene at different moments. The polarizing device 152 is overlapped with an input path of the pick-up device 130 corresponding to the second image when the pick-up device 130 acquires the second image.

Figure 7B:
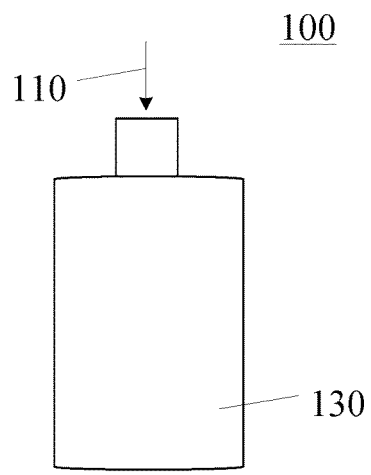
FIG. 7b is a schematic top view of an image collecting system provided by at least one embodiment of the present disclosure in a process of acquiring a first image.

For instance, as illustrated in FIG. 7b, when the pick-up device 130 acquires the first image, the polarizing device (not shown in FIG. 7b) may be disposed outside an input path of the pick-up device 130 corresponding to the first image, so that first incident light 110 for forming the first image and second incident light 120 (as shown in FIG. 7a) for forming the second image, entering the pick-up device 130, can have different polarization states. For instance, by adoption of the polarization switching device as shown in FIGS. 5a and 5b, the polarizing device 152 is disposed outside the input path of the pick-up device 130 corresponding to the first image when the pick-up device 130 acquires the first image, and disposed in the input path corresponding to the second image when the pick-up device acquires the second image.

For instance, the polarizing device 152 may also change the polarization direction through the rotating device 180 as shown in FIG. 6, so that the first incident light 110 and the second incident light 120 can have different polarization states.

The polarization direction, or the like of the polarizing device 152 may refer to the design modes in any foregoing embodiment. No further description will be given to the same details herein.

Figure 8:
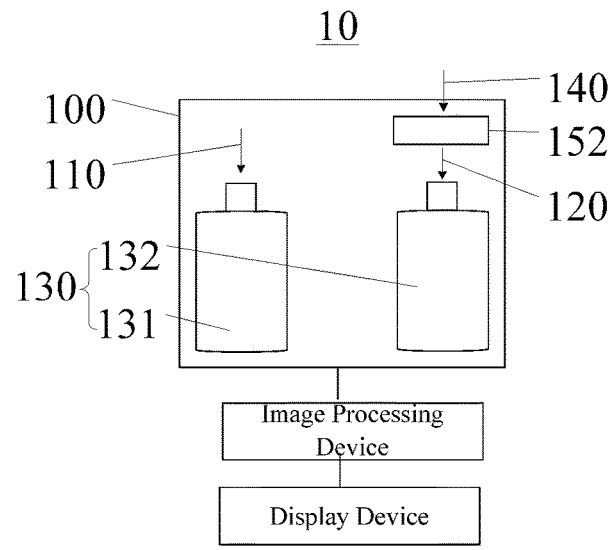
FIG. 8 is a structural block diagram of an image collecting processing system provided by at least one embodiment of the present disclosure.

At least one embodiment of the present disclosure provides an image collecting processing system. As illustrated in FIG. 8, the image collecting processing system 10 includes an image processing device and the image collecting system 100 provided by any foregoing embodiment. The image collecting system 100 communicates with the image processing device in signals.

The image processing device is configured to generate a target image according to a first image and a second image acquired by the image collecting system 100. For instance, it may be implemented by a computing device (e.g., a central processing unit (CPU)), a special computing device (e.g., a digital signal processor (DSP)), or the like. No further description will be given herein.

The image collecting system 100 and the image processing device may adopt any type of wired or wireless connection, as long as the first image and the second image acquired by the image collecting system 100 can be sent to the image processing device.

For instance, an image collecting processing system provided by at least one embodiment of the present disclosure may further include a display device, which, as shown in FIG. 8, is configured to display the target image outputted by the image processing device.

The image collecting systems and the image collecting processing devices in the embodiments of the present disclosure may be applied in the automotive field, so as to reduce the impact of rain on the images acquired by the image collecting system on rainy days.

Figure 9:
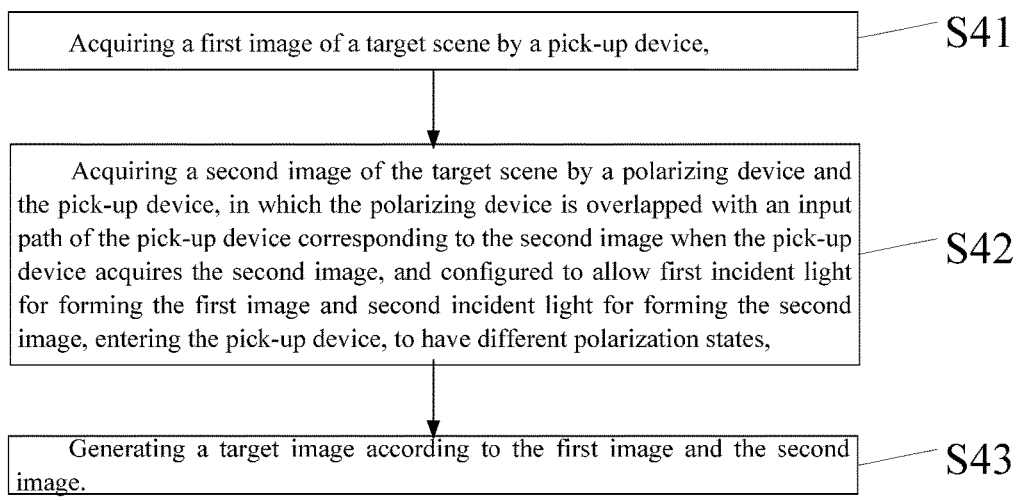
FIG. 9 is a flowchart of an image collecting processing system provided by at least one embodiment of the present disclosure.

At least one embodiment of the present disclosure provides an image collecting processing method. As illustrated in FIG. 9, the method includes the following steps.

S41: acquiring a first image of a target scene by a pick-up device.

S42: acquiring a second image of the target scene by a polarizing device and the pick-up device. In the step, the polarizing device is overlapped with an input path of the pick-up device corresponding to the second image when the pick-up device acquires the second image, and configured to allow first incident light for forming the first image and second incident light for forming the second image, entering the pick-up device, to have different polarization states.

For instance, the image collecting system including the first sub-pick-up device and the second sub-pick-up device, provided by any foregoing embodiment, may be adopted to acquire the first image and the second image. That is to say, as illustrated in FIG. 1, the pick-up device 130 may include a first sub-pick-up device 131 and a second sub-pick-up device 132. In this case, the step S41 may include acquiring the first image of the target scene by the first sub-pick-up device 13; and the step S42 may include acquiring the second image of the target scene by the second sub-pick-up device 132. When the second sub-pick-up device 132 acquires the second image, the polarizing device 152 is overlapped with an input path of the second sub-pick-up device 132.

For instance, the steps S41 and S42 may be synchronously executed, namely the first sub-pick-up device 131 and the second sub-pick-up device 132 may pick up a target scene at a same moment to acquire a first image and a second image. Alternatively, the steps S41 and S42 may also be respectively executed at different moments, and the sequence may be exchanged.

For instance, in the step S41, the second polarizing device 151 and the first sub-pick-up device 131 as shown in FIG. 4 may be adopted to pick up the target scene to acquire the first image; when the first sub-pick-up device 131 acquires the first image, the second polarizing device 151 is overlapped with an input path of the first sub-pick-up device 131; and the polarization direction of the second polarizing device is different from the polarization direction of the polarizing device 152. The second polarizing device 151 may reduce the impact of rain on the first image. As the two polarizing devices have different polarization directions, the first image and the second image can include different target scene information, so that the accuracy of the target image can be improved.

For instance, the image collecting system including one pick-up device, provided by any foregoing embodiment, may also be adopted to acquire the first image and the second image. That is to say, the step S41 may include adopting the pick-up device 130 as shown in FIG. 7b to pick up the target scene at a first moment to acquire the first image; and the step S42 may include adopting the pick-up device 130 and the polarizing device 152 as shown in FIG. 7a to pick up the target scene at a second moment to acquire the second image. The sequences of the steps S41 and S42 may also be exchanged.

In the method provided by the embodiments of the present disclosure, other designs of the polarizing device and the pick-up device may refer to relevant description in the above embodiments. No further description will be given herein.

After the steps S41 and S42 are finished, the step S43, namely generating the target image according to the first image and the second image, is executed.

In the step S43, the first image and the second image may be compared to obtain the target image. Compared with the way of the image collecting processing system commonly used in the field of obtaining the target image after acquiring the initial image and analyzing and processing the initial image, this way of obtaining the target image by the comparison may more accurately identify what positions of the first image and the second image have more real information and what positions of the information are required to be processed, so that the accuracy of image processing can be improved and the amount of image information processing and the processing time can be reduced.

For instance, the target image may be generated by comparing image information of corresponding pixels in the first image and the second image. In this case, the step S42 may include determining a first pixel in the first image and a second pixel in the second image, which represent a same object point of the target scene, and comparing image information of the first pixel in the first image with image information of the second pixel in the second image; and generating the target image by utilizing the second pixel in the second image when the comparison result is that the difference between the image information of the first pixel in the first image and the image information of the second pixel in the second image is less than or equal to a first threshold or greater than a second threshold.

Description will be given below by taking the case that the first image and the second image are respectively represented by an array X and an array Y as an example, $$X = \begin{pmatrix} A11, A12, A13, A14 \ldots A1N \\ A21, A22, A23, A24 \ldots A2N \\ A31, A32, A33, A34 \ldots A3N \\ \ldots \\ AM1, AM2, AM3, AM4, \ldots AMN \end{pmatrix},$$

$$Y = \begin{pmatrix} B11, B12, B13, B14 & \ldots & B1N \\ B21, B22, B23, B24 & \ldots & B2N \\ B31, B32, B33, B34 & \ldots & B3N \\ & \ldots & \\ BM1, BM2, BM3, BM4 & \ldots & BMN \end{pmatrix},$$

where A11, ..., AMN in the array X represent position information and image information of pixels in the first image; B11, ..., BMN in the array Y represent position information and image information of pixels in the second image; an array Z may be obtained by calculating X-Y; and the value of a number Zij=Xij−Yij (i refers to an integer from 1 to M, and j refers to an integer from 1 to N) in the array Z may be as follows: the first type of value is that an absolute value of Zij is within the range [0, β]; Pt the second type of value is that the absolute value of Zij is within the range [β, θ]; and the third type of value is that the absolute value of Zij is (θ, ∞), and 0<β<θ.

The first type of value, namely the absolute of Zij is within the range [0, β], indicates that the difference between Aij of the first image and Bij of the second image is very small. The reason may be that there is no rain water at an object point of the target scene corresponding to Bij of the second image, and may also be that the polarizing device cannot eliminate the impact of rain due to too much rain water at the object point. Therefore, in this case, the target image may be generated by adopting the position information and the image information of Bij. That is to say, when the difference between the first pixel and the second pixel is less than or equal to the first threshold β, the target image may be generated by utilizing the second pixel of the second image. It is noted that one or more numbers in the array X may be adopted to indicate the first pixel, and the second pixel in the second image may also be set similarly.

The third type of value, namely the absolute value of Zij is (θ, ∞) and 0<β<θ, indicates that the difference between the first image and the second image is very large. It indicates that the polarizing device can reduce the impact of rain. Therefore, in this case, the target image may be generated by adopting the position information and the image information of Bij. That is to say, when the difference between the first pixel and the second pixel is greater than the second threshold θ, the target image may be generated by adopting the second pixel of the second image.

As for the second type of value between the first type of value and the third type of value, a common way in the field may be adopted to process information of positions provided with the second type of values and fill the information at corresponding positions of the target image.

The first threshold and the second threshold may be set according to actual demands.

The analyzing and processing ways of the first type of value and the third type of value may be simplified by the comparison of the first image and the second image. Compared with the way of analyzing and processing all data of the images in a commonly used image collecting processing system, the amount of information processing and the processing time can be reduced.

For instance, in order to improve the accuracy of the target image, an image collecting processing method provided by at least one embodiment of the present disclosure may also include: before step S43, adjusting the brightness of the second image according to the transmittance of the polarizing device and the initial brightness of the second image (namely the brightness of the second image directly acquired by the pick-up device). For instance, the initial brightness of the second image may be divided by the transmittance of the polarizing device, so that the brightness of the first image and the second image can be restored to the same level.

When the image collecting system as shown in FIG. 4 is adopted to acquire the first image and the second image, in an instance that the transmittance of the polarizing device 152 is different from the transmittance of the second polarizing device 151, the brightness of the first image and the brightness of the second image may be consistent by dividing the initial brightness of the second image by the transmittance of the polarizing device 152 and dividing the initial brightness of the first image by the transmittance of the second polarizing device 151; and if the transmittance of the polarizing device 152 is the same as the transmittance of the second polarizing device 151, the step of adjusting the image brightness can be eliminated.

For instance, the image collecting system including the first sub-pick-up device and the second sub-pick-up device, provided by any foregoing embodiment, is adopted to acquire the first image and the second image; and an image collecting processing method provided by at least one embodiment of the present disclosure may also include: before the step S43, processing at least one of the first image or the second image, so that no parallax is presented between the first image and the second image. For instance, positions of the numbers in the array X may be translated, so that the position information of the numbers in the array X can be consistent with the position information of the numbers in the array Y. In this way, misjudgment caused by the parallax of two pick-up devices can be reduced. The parallax between the first image and the second image may be eliminated by an image parallax processing method commonly used in the field. No further description will be given herein.

The image collecting processing method provided by the embodiments of the present disclosure can be applied in the image collecting processing system provided by any foregoing embodiment. The image collecting processing method provided by the embodiments of the present disclosure may reduce the impact of rain water on the target image by adopting the polarizing device, generate the target image by the comparison of the first image and the second image, and reduce the amount of information processing and the processing time of the first image and the second image and improve the accuracy of image processing.

Description is given to the image collecting system, the image processing system and the image collecting processing method, provided by embodiments of the present disclosure, by taking two images (namely the first image and the second image) of the same target scene as an example. More images (e.g., a third image, a fourth image, or the like) may also be acquired by utilizing the embodiments of the present disclosure, so that a plurality of target images can be acquired.

The foregoing is only the exemplary embodiments of the present disclosure and not intended to limit the scope of the present disclosure. The scope of the present disclosure is defined by the appended claims.

The present application claims priority to the Chinese patent application No. 201610082147.9 filed on Feb. 5, 2016, the entire disclosure of which is incorporated herein by reference as part of the present application.

What is claimed is:

1. An image collecting system, comprising:
a camera configured to acquire a first image and a second image of a target scene; and
a first polarizer configured to be overlapped with an input path of the camera corresponding to the second image when the camera acquires the second image, and configured to allow first incident light for forming the first image and second incident light for forming the second image, entering the camera, to have different polarization states; and
a polarization switching device comprising a slide rail and a sliding block capable of sliding on the slide rail with the first polarizer being provided on the sliding block, and configured to move the first polarizer into the input path when the camera acquires the second image, or move the first polarizer out of the input path.

2. The image collecting system according to claim 1, wherein
the camera includes a first sub-camera and a second sub-camera, the first sub-camera being configured to acquire the first image of the target scene, the second sub-camera being configured to acquire the second image of the target scene; and
the first polarizer is overlapped with an input path of the second sub-camera when the second sub-camera acquires the second image.

3. The image collecting system according to claim 2, wherein
the camera includes a light-splitting device, the light-splitting device being configured to split light, which comes from the target scene and is incident into the light-splitting device, into a first light path for the first sub-camera and a second light path for the second sub-camera; and
the polarizer is disposed in the second light path when the second sub-camera acquires the second image.

4. The image collecting system according to claim 3, further comprising a support substrate, wherein the support substrate has a support surface; and the first sub-camera and the second sub-camera are sequentially arranged along the direction perpendicular to the support surface.

5. The image collecting system according to claim 1, further comprising a support substrate, wherein the support substrate has a support surface for supporting the camera; and the polarization direction of the polarizer is perpendicular to the support surface.

6. The image collecting system according to claim 1, further comprising:
a second polarizer disposed in an input path of the camera corresponding to the first image when the camera acquires the first image, wherein the polarization direction of the second polarizer is different from the polarization direction of the first polarizer.

7. The image collecting system according to claim 6, wherein the polarization direction of the second polarizer is perpendicular to the polarization direction of the first polarizer.

8. The image collecting system according to claim 7, wherein transmittance of the second polarizer is the same as transmittance of the first polarizer.

9. The image collecting system according to claim 1, further comprising: a rotating device configured to rotate the first polarizer to change the polarization direction of the first polarizer.

10. An image collecting processing system, comprising the image collecting system according to claim 1, and an image processor configured to generate a target image according to the first image and the second image.

11. The image collecting processing system according to claim 10, further comprising:
a display device configured to display the target image outputted by the image processor.

12. An image collecting processing method, comprising:
acquiring a first image of a target scene by a pick-up device;
acquiring a second image of the target scene by a first polarizing device and the pick-up device, wherein the first polarizing device is overlapped with an input path of the pick-up device corresponding to the second image when the pick-up device acquires the second image, to allow first incident light for forming the first image and second incident light for forming the second image, entering the pick-up device, to have different polarization states;
moving the first polarizing device into the input path by a polarization switching device when the pick-up device acquires the second image, or moving the first polarizing device by a polarization switching device out of the input path, wherein the polarization switching device comprises a slide rail and a sliding block capable of sliding on the slide rail and the first polarizing device is provided on the sliding block; and
generating a target image according to the first image and the second image.

13. The image collecting processing method according to claim 12, further comprising:
picking up the target scene at a first moment to acquire the first image by utilizing the pick-up device; and
picking up the target scene at a second moment to acquire the second image by utilizing the pick-up device and the first polarizing device.

14. The image collecting processing method according to claim 12, further comprising:
adjusting brightness of the second image according to the transmittance of the first polarizing device and an initial brightness of the second image.

15. An image collecting processing method, comprising:
acquiring a first image of a target scene by a pick-up device;
acquiring a second image of the target scene by a first polarizing device and the pick-up device, wherein the first polarizing device is overlapped with an input path of the pick-up device corresponding to the second image when the pick-up device acquires the second image, to allow first incident light for forming the first image and second incident light for forming the second image, entering the pick-up device, to have different polarization states; and
generating a target image according to the first image and the second image; wherein
a first pixel in the first image and a second pixel in the second image, representing the same object point of the target scene, are determined; and
image information of the first pixel and image information of the second pixel are compared, in which the target image is generated by utilizing the second pixel of the second image when the comparison result is that a difference between the image information of the first pixel and the image information of the second pixel is less than or equal to a first threshold or greater than a second threshold.

16. The image collecting processing method according to claim 15, wherein the pick-up device includes a first sub-pick-up device and a second sub-pick-up device; and
the method comprises:
acquiring the first image of the target scene by the first sub-pick-up device; and
acquiring the second image of the target scene by the second sub-pick-up device, in which the first polarizing device is overlapped with an input path of the second sub-pick-up device when the second sub-pick-up device acquires the second image.

17. The image collecting processing method according to claim 16, wherein the first sub-pick-up device and the second sub-pick-up device pick up the target scene at a same moment to acquire the first image and the second image.

18. The image collecting processing method according to claim 17, further comprising:
processing at least one of the first image, and the second image, so that no parallax is presented between the first image and the second image.

19. The image collecting processing method according to claim 18, further comprising:
picking up the target scene to acquire the first image by utilizing second polarizing device and the first sub-pick-up device, in which
when the first sub-pick-up device acquires the first image, the second polarizing device is overlapped with an input path of the first sub-pick-up device, and the polarization direction of the second device is different from the polarization direction of the first polarizing device.

* * * * *